(12) United States Patent
Taniguchi et al.

(10) Patent No.: US 12,383,934 B2
(45) Date of Patent: Aug. 12, 2025

(54) CLEANING DEVICE

(71) Applicant: Panasonic Intellectual Property Management Co., Ltd., Osaka (JP)

(72) Inventors: Yasushi Taniguchi, Osaka (JP); Kazutaka Nishikawa, Nara (JP); Takayuki Ashida, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 193 days.

(21) Appl. No.: 18/275,120

(22) PCT Filed: Jan. 18, 2022

(86) PCT No.: PCT/JP2022/001544
§ 371 (c)(1),
(2) Date: Jul. 31, 2023

(87) PCT Pub. No.: WO2022/176475
PCT Pub. Date: Aug. 25, 2022

(65) Prior Publication Data
US 2024/0042492 A1 Feb. 8, 2024

(30) Foreign Application Priority Data

Feb. 18, 2021 (JP) ................................. 2021-024231

(51) Int. Cl.
*B08B 3/02* (2006.01)
*B08B 13/00* (2006.01)
*G06T 7/90* (2017.01)
*H01M 50/609* (2021.01)

(52) U.S. Cl.
CPC ................. *B08B 3/02* (2013.01); *B08B 13/00* (2013.01); *G06T 7/90* (2017.01); *H01M 50/609* (2021.01); *G06T 2207/30108* (2013.01)

(58) Field of Classification Search
None
See application file for complete search history.

(56) References Cited

U.S. PATENT DOCUMENTS 5,589,225 A 12/1996 Yamada et al.

FOREIGN PATENT DOCUMENTS

| JP | H07-220718 A | 8/1995 | |
| KR | 100190831 B1 * | 6/1996 | ........ H01M 10/288 |

OTHER PUBLICATIONS

KR 100190831 B1 machine translation, Suzuki, A nozzle for injecting an electrolyte into the battery case (Year: 1999).*
KR 0180200 B1 machine translation, Byun, Method and Apparatus for Automatically Cleaning Electrolyte of Lithium Ion Battery (Year: 1999).*
CN 103000857 A, Yu, Battery Electrolyte Injection Device and Injection Method (Year: 2013).*
(Continued)

*Primary Examiner* — Cristi J Tate-Sims
(74) *Attorney, Agent, or Firm* — Rimon P.C.

(57) ABSTRACT

A cleaning device includes: a base that supports a liquid injection member that injects an electrolyte to a battery case; a cleaning unit that sprays a cleaning liquid onto the liquid injection member supported by the base; and an inspection unit that inspects the spraying condition of the cleaning liquid by receiving a spray of the cleaning liquid from the cleaning unit.

4 Claims, 5 Drawing Sheets

(56) References Cited

OTHER PUBLICATIONS

Extended European Search Report dated Jul. 1, 2024, from corresponding EP Application No. 22755800.4, 7 pages.
International Search Report issued in corresponding International Application No. PCT/JP2022/001544, dated Mar. 1, 22, 2022 with English translation.

* cited by examiner

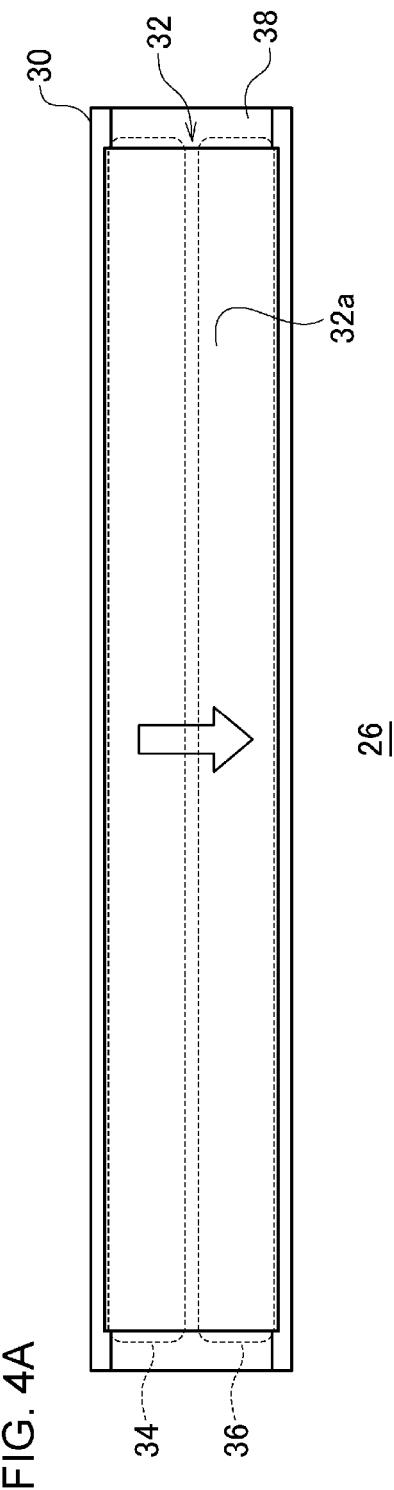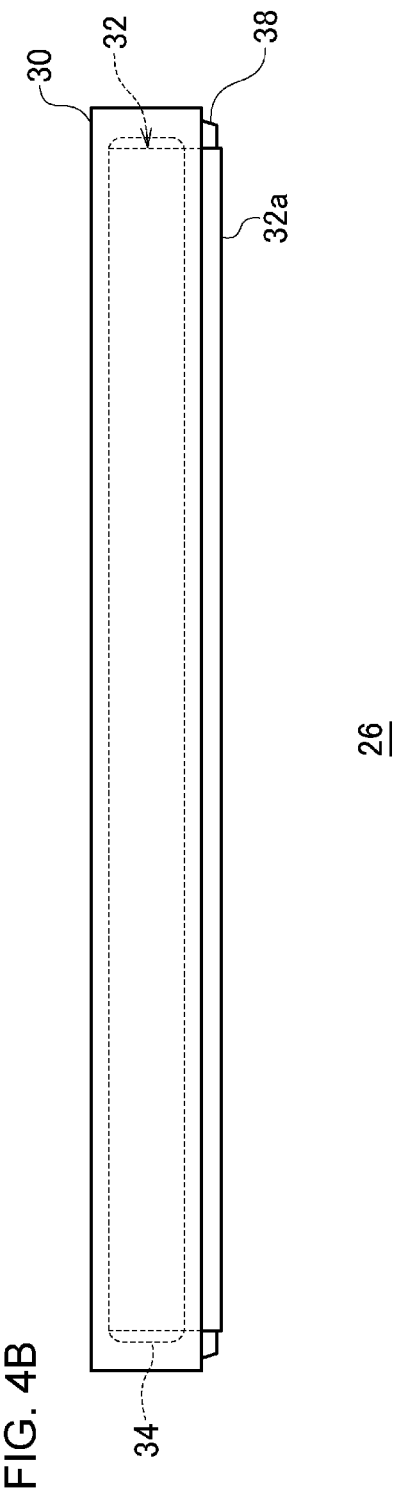

CLEANING DEVICE

CROSS-REFERENCE TO RELATED APPLICATIONS

This application is the U.S. National Phase under 35 U.S.C. § 371 of International Patent Application No. PCT/JP2022/001544, filed on Jan. 18, 2022, which in turn claims the benefit of Japanese Patent Application No. 2021-024231, filed on Feb. 18, 2021, the entire content of each of which is incorporated herein by reference.

BACKGROUND

Field of the Invention

The present disclosure relates to cleaning devices.

Description of the Related Art

In the field of manufacturing of batteries such as lithium-ion secondary batteries, batteries are generally manufactured by injecting an electrolyte into a battery case after putting an electrode body in the battery case. An electrolyte supply device is used to inject the electrolyte into the battery case. The electrolyte supply device has a cylindrical liquid injection member (also called a liquid injection pot) into which the battery case is inserted, and the electrolyte is injected from the liquid injection member into the battery case.

As the liquid injection process is repeated, the electrolyte sometimes crystallizes on the surface of the liquid injection member. If the crystallization of the electrolyte occurs, problems can occur such as variations in the amount of the electrolyte that is injected. Therefore, it is necessary to periodically remove the liquid injection member from the electrolyte supply device and clean the injection member. This cleaning task is generally performed manually, which requires a lot of labor and time, and there is a problem that the removal of the cleaning liquid may be incomplete. In contrast, for example, Patent Literature 1 discloses an electrolyte supply device in which a cleaning device for a liquid injection member is incorporated.

Patent Literature: Japanese Unexamined Patent Application Publication No. H7-220718

The present inventors have made a series of intensive studies on cleaning devices for liquid injection members and found that there is room for improvement in related-art cleaning devices in terms of improving the quality of cleaning.

SUMMARY OF THE INVENTION

In this background, a purpose of the present disclosure is to provide a technology for improving the quality of cleaning liquid injection members used for injection of an electrolyte into a battery case.

One embodiment of the present disclosure relates to a cleaning device. This cleaning device includes: a base that supports a liquid injection member that injects an electrolyte to a battery case; a cleaning unit that sprays a cleaning liquid onto the liquid injection member supported by the base; and an inspection unit that inspects the spraying condition of the cleaning liquid by receiving a spray of the cleaning liquid from the cleaning unit.

Optional combinations of the aforementioned constituting elements, and implementations of the present disclosure in the form of methods, apparatuses, and systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 4A is a plan view of the liquid receiver; FIG. 4B is a side view of the liquid receiver.

DETAILED DESCRIPTION OF THE INVENTION

Figure 1:
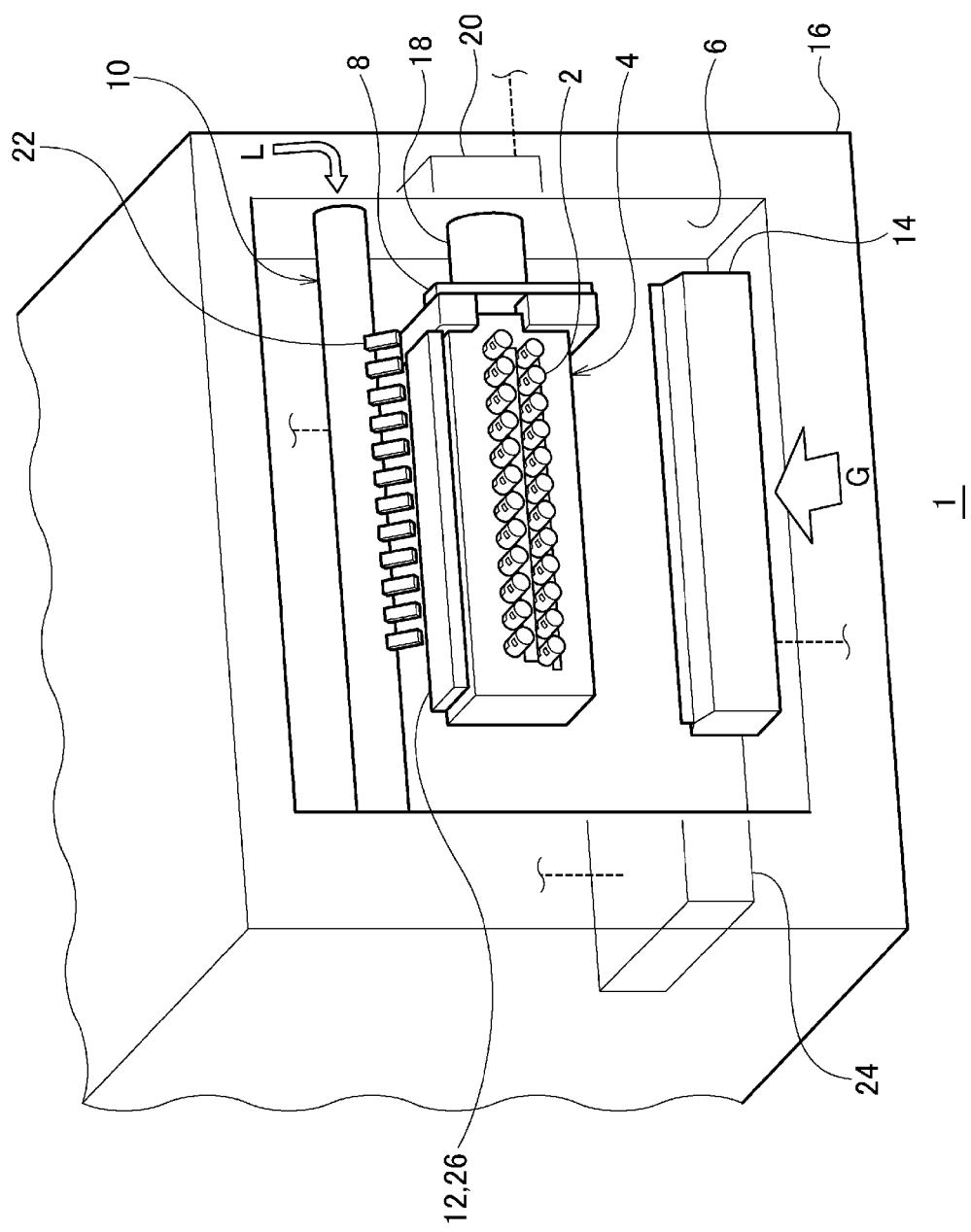
FIG. 1 is a schematic diagram of a cleaning device according to an embodiment.

Hereinafter, the present disclosure will be described based on a preferred embodiment with reference to the figures. The embodiments do not limit the present disclosure and are shown for illustrative purposes, and not all the features described in the embodiments and combinations thereof are necessarily essential to the present disclosure. The same or equivalent constituting elements, members, and processes illustrated in each drawing shall be denoted by the same reference numerals, and duplicative explanations will be omitted appropriately.

The scales and shapes shown in the figures are defined for convenience's sake to make the explanation easy and shall not be interpreted limitatively unless otherwise specified. Terms like "first", "second", etc., used in the specification and claims do not indicate an order or importance by any means unless specified otherwise and are used to distinguish a certain feature from the others. Some of the components in each figure may be omitted if they are not important for explanation.

FIG. 1 is a schematic diagram of a cleaning device 1 according to an embodiment. The cleaning device 1 is a device for cleaning a liquid injection member 2 that injects an electrolyte into a battery case. The liquid injection member 2, also called a liquid injection pot, is a hollow cylinder, and an electrolyte is supplied from the main unit side of an electrolyte supply device. A battery case in which an electrode body is housed is inserted into the liquid injection member 2 such that an opening of the case faces the liquid injection member 2 side. The electrolyte is then injected into the battery case from the liquid injection member 2. The liquid injection member 2 as an example takes the form of a liquid injection chamber 4 in which a plurality of liquid injection members 2 are arranged as shown in FIG. 1. The liquid injection chamber 4 is provided detachably with respect to the main unit of the electrolyte supply device. The liquid injection chamber 4 as an example has a rectangular shape that is long in one direction, and a plurality of liquid injection members 2 are arranged on one surface of the rectangular shape. The plurality of liquid injection members 2 are aligned in the longitudinal direction of the liquid injection chamber 4. The arrangement and number of the liquid injection members 2 are not particularly limited.

The cleaning device 1 includes a housing recess 6, a base 8, a cleaning unit 10, an inspection unit 12, and a drying unit 14. The housing recess 6 is a box-like space provided in the housing 16 of the cleaning device 1 and houses the base 8, the cleaning unit 10, the inspection unit 12, and the drying unit 14. The housing recess 6 has an opening on the front surface of the device, and the liquid injection chamber 4 is moved in and out of the housing recess 6 through this opening.

The base 8 supports a liquid injection member 2 to be cleaned. The base 8 according to the present embodiment supports the liquid injection chamber 4. The liquid injection chamber 4 is fixed to the base 8 at one end in the longitudinal direction. The base 8 is connected to a drive unit 20 via a rotating shaft 18. The drive unit 20 can consist of a publicly-known motor. The rotating shaft 18 is connected to an output shaft of the drive unit 20 and rotates around the shaft by means of the driving of the drive unit 20. The base 8 rotates along with the rotation of the rotating shaft 18. This allows the orientation of the liquid injection chamber 4 mounted on the base 8 and even the orientation of the liquid injection member 2 to be changed.

The cleaning unit 10 sprays a cleaning liquid L onto the liquid injection member 2 supported by the base 8. Although the cleaning liquid L is not particularly limited, the cleaning liquid L is, for example, water. The cleaning unit 10 according to the present embodiment consists of a pipe that extends parallel to the longitudinal direction of the liquid injection chamber 4. The cleaning unit 10 has a plurality of injection nozzles 22. The plurality of injection nozzles 22 are arranged parallel to the longitudinal direction of the liquid injection chamber 4. The plurality of injection nozzles 22 are arranged so as to correspond one-to-one to the plurality of liquid injection members 2. As an example, the cleaning liquid L is supplied to the cleaning unit 10 from a tank (not shown) provided in the housing 16. A city water pipe is connected to the tank, and water is supplied from the city water pipe as the cleaning liquid L. The cleaning unit 10 may be directly connected to the city water pipe. The cleaning liquid L supplied to the cleaning unit 10 is sprayed at a predetermined pressure from the injection nozzles 22 to the respective liquid injection members 2. As an example, after the injection, the cleaning liquid passes through a filtration mechanism (not shown) and is then returned to the tank, and the cleaning liquid is again sprayed from the injection nozzles 22.

The inspection unit 12 inspects the spraying condition of the cleaning liquid L by receiving a spray of the cleaning liquid L from the cleaning unit 10. The inspection unit 12 according to the present embodiment inspects the spraying pressure and spraying range of the cleaning liquid L as the spraying condition of the cleaning liquid L. Inspection items are not limited to the spraying pressure and the spraying range and may include only one of the spraying pressure and the spraying range or may include conditions other than the pressure and the range. The inspection unit 12 has a liquid receiver 26, and the liquid receiver 26 is mounted on the base 8. The liquid receiver 26 is arranged on the lateral side of the liquid injection chamber 4 mounted on the base 8 (the side of a long lateral surface in contact with the surface where the liquid injection members 2 are provided). The liquid receiver 26 may be arranged on the back side of the liquid injection chamber 4 (the side of a surface facing the surface where the liquid injection members 2 are provided).

Figure 2A:
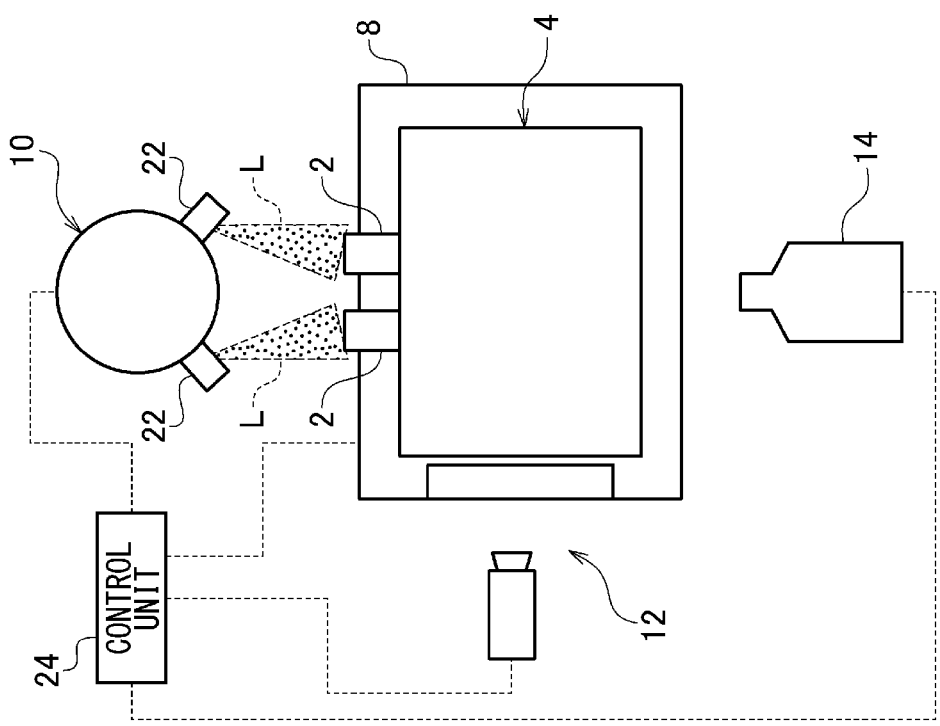
FIG. 2A is a schematic diagram showing the condition of a cleaning process.
Figure 3A:
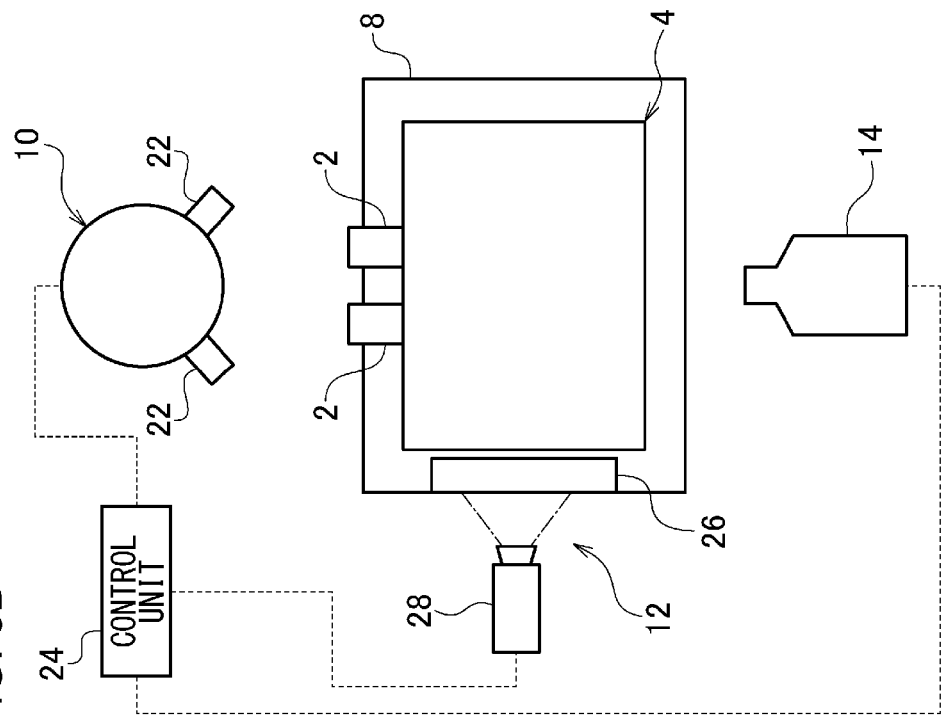
FIG. 3A is a schematic diagram showing the spraying of a cleaning liquid onto a liquid receiver.

The base 8 can be switched between a state in which the liquid injection members 2 face the cleaning unit 10 (see FIG. 2A) and a state in which the liquid receiver 26 faces the cleaning unit 10 (see FIG. 3A). The structure of the inspection unit 12 and inspections performed by the inspection unit 12 will be explained in detail later.

The drying unit 14 removes the cleaning liquid L adhering to the liquid injection members 2 after cleaning and dries the liquid injection members 2. For example, the drying unit 14 can be formed using a publicly-known drying device such as an air knife. As an example, a blower or compressor (not shown) provided in the housing 16 supplies gas G such as air to the drying unit 14. The drying unit 14 blows this gas G onto the liquid injection members 2 so as to thereby remove the cleaning liquid L adhering to the liquid injection members 2.

A control unit 24 is provided in the housing 16. The control unit 24 controls the operation of the base 8, the cleaning unit 10, the inspection unit 12, and the drying unit 14. The control unit 24 also executes programs for cleaning the liquid injection members 2, drying the liquid injection members 2, and inspecting the spraying condition of the cleaning liquid L. The control unit 24 is implemented by an element such as a CPU or memory of a computer or by a circuit as a hardware configuration, and by a computer program or the like as a software configuration. It will be obvious to those skilled in the art that the control unit 24 may be implemented in a variety of manners by a combination of hardware and software.

Figure 2B:
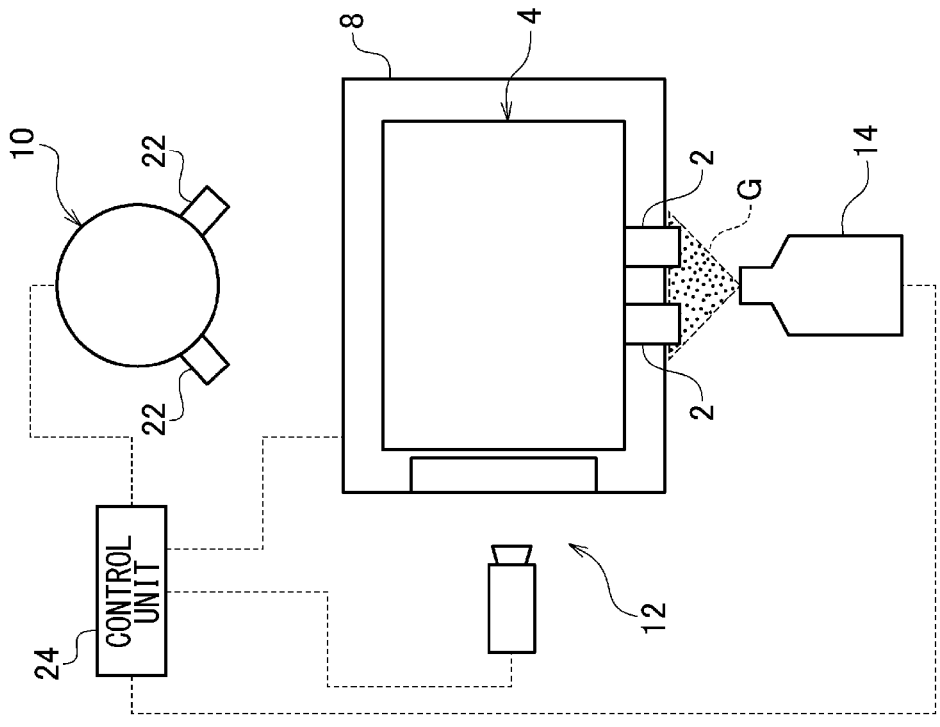
FIG. 2B is a schematic diagram showing the condition of a drying process.

Next, an explanation will be given regarding cleaning and drying processes for the liquid injection members 2. FIG. 2A is a schematic diagram showing the condition of the cleaning process. FIG. 2B is a schematic diagram showing the condition of the drying process. FIGS. 2A and 2B illustrate the condition of the inside of the housing recess 6 viewed from the longitudinal direction of the liquid injection chamber 4.

As shown in FIG. 2A, when the cleaning process is performed on the liquid injection members 2, the orientation of the base 8 is set such that each liquid injection member 2 faces the cleaning unit 10. In this state, a cleaning liquid L is sprayed from the cleaning unit 10 onto each of the liquid injection members 2 so as to clean each of the liquid injection members 2. As an example, each liquid injection member 2 repeats fine rotation during cleaning. This allows the cleaning area of the liquid injection member 2 cleaned by the cleaning unit 10 to be expanded. As a result, the cleaning liquid L is sprayed evenly over the entire inside and outside of the liquid injection member 2, and residue of (soiling by) a crystallized electrolyte and the like can be suppressed. Further, the injection of the electrolyte from the liquid injection member 2 into the battery case is generally carried out in a dry air environment with almost no humidity. On the other hand, the cleaning process of the liquid injection member 2 is preferably performed in an atmosphere with higher humidity than that in a dry air environment, for example, in the atmosphere. Further, the liquid injection member 2 is preferably left in the atmosphere for a predetermined period of time (e.g., 10 minutes or more) prior to the cleaning process. This allows the crystals of the electrolyte adhering to the liquid injection member 2 to react with the moisture in the atmosphere and so as to be softened. As a result, the crystals of the electrolyte can be easily removed.

As shown in FIG. 2B, after the cleaning process is finished, the control unit 24 controls the drive unit 20, thereby causing the base 8 to rotate such that the liquid injection member 2 faces the drying unit 14. In this state, the drying unit 14 blows gas G onto the liquid injection member 2 so as to dry the liquid injection member 2.

Figure 3B:
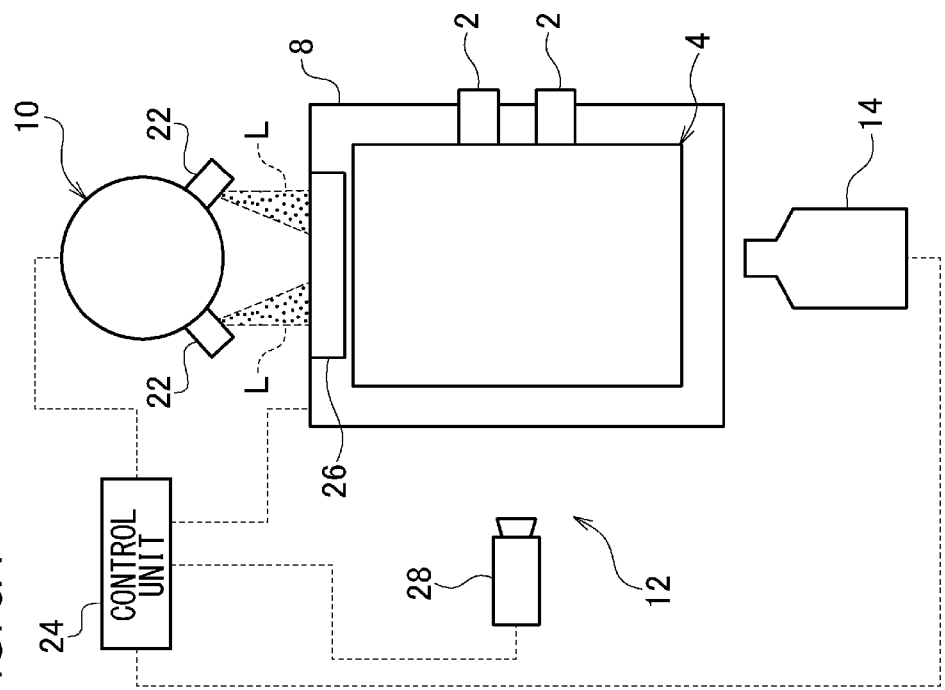
FIG. 3B is a schematic diagram showing the capturing of an image of the liquid receiver by an image-capturing unit.

Next, an explanation will be given regarding the inspection of the spraying condition performed by the inspection unit 12. FIG. 3A is a schematic diagram showing the spraying of the cleaning liquid L onto the liquid receiver 26. FIG. 3B is a schematic diagram showing the capturing of an image of the liquid receiver 26 by an image-capturing unit 28. FIG. 4A is a plan view of the liquid receiver 26. FIG. 4B is a side view of the liquid receiver 26. FIGS. 3A and 3B illustrate the condition of the inside of the housing recess 6 viewed from the longitudinal direction of the liquid injection chamber 4.

The inspection unit 12 according to the present embodiment has a liquid receiver 26 that receives a spray of a cleaning liquid L and an image-capturing unit 28 that captures images of the liquid receiver 26. The liquid receiver 26 is mounted on the base 8. The image-capturing unit 28 is fixed at a predetermined position inside the housing recess 6, for example, at the rear side of the liquid injection chamber 4 viewed from the opening of the housing recess 6. In the inspection of the spraying condition of the cleaning liquid L, the orientation of the base 8 is first set such that the liquid receiver 26 faces the cleaning unit 10, as shown in FIG. 3A. In this state, the cleaning liquid L is sprayed from the cleaning unit 10 onto the liquid receiver 26.

As shown in FIGS. 4A and 4B, the liquid receiver 26 as an example has a housing 30, a pressure-sensitive sheet 32, an unwinding roll 34, a winding roll 36, and an underlay plate 38. The housing 30 houses the unwinding roll 34 and the winding roll 36.

The pressure-sensitive sheet 32 changes color due to pressure received at the time of receiving a spray of the cleaning liquid L. The pressure-sensitive sheet 32 can be made of, for example, publicly-known pressure-sensitive paper. The pressure-sensitive sheet 32 has a strip shape that is long in one direction, one end of which is fixed to the unwinding roll 34 and the other end of which is fixed to the winding roll 36. In a state before the liquid receiver 26 is started being used, the entire pressure-sensitive sheet 32 is substantially being wound around the unwinding roll 34. A flat portion of the pressure-sensitive sheet 32 that is bridged from the unwinding roll 34 to the winding roll 36 is exposed to the outside of the housing 30 and constitutes a liquid receiving surface 32a. The cleaning liquid L sprayed from the cleaning unit 10 is sprayed onto the liquid receiving surface 32a. As a result, the color of a portion of the liquid receiving surface 32a on which the cleaning liquid L has been sprayed changes.

Preferably, the distance from each injection nozzle 22 of the cleaning unit 10 to the liquid receiving surface 32a is set shorter than the distance from each injection nozzle 22 to each liquid injection member 2 when the cleaning process for the liquid injection members 2 is performed. This prevents the cleaning liquid L sprayed from each of the injection nozzles 22 from being sprayed onto the same area of the liquid receiving surface 32a. In other words, individual areas on the liquid receiving surface 32a that receive the cleaning liquid L from the respective injection nozzles 22 can be prevented from overlapping each other.

The underlay plate 38 is provided between the liquid receiving surface 32a and the unwinding and winding rolls 34 and 36. The back side of the liquid receiving surface 32a is supported by the underlay plate 38. This allows the liquid receiving surface 32a to be sprayed with the cleaning liquid L while the liquid receiving surface 32a is in a more stable orientation. Preferably, a waterproof sheet (not shown) is provided to cover the liquid receiving surface 32a. The spraying pressure of the cleaning liquid L is applied to the liquid receiving surface 32a through the waterproof sheet. This reduces the risk of the pressure-sensitive sheet 32 being wet and damaged by a spray of cleaning liquid L.

After the cleaning liquid L is sprayed onto the liquid receiver 26, the base 8 is rotated such that the liquid receiver 26 faces the image-capturing unit 28 as shown in FIG. 3B. In this state, the image-capturing unit 28 captures an image of the pressure-sensitive sheet 32 (liquid receiving surface 32a) so as to detect the color of the pressure-sensitive sheet 32. The image-capturing unit 28 can consist of a publicly-known visible light camera or the like. The image-capturing unit 28 transmits a captured image, in other words, the inspection result from the inspection unit 12, to the control unit 24.

After the image-capturing by the image-capturing unit 28, in other words, the inspection by the inspection unit 12 is finished, the unwinding roll 34 and the winding roll 36 rotate synchronously. As a result, a portion of the pressure-sensitive sheet 32 that has been sprayed with the cleaning liquid L, i.e., a used portion, moves from the liquid receiving surface 32a to the winding roll 36 side. The unused portion reaches the liquid receiving surface 32a along with this. By this operation, the spraying condition of the cleaning liquid L can be repeatedly inspected.

The control unit 24 can perform publicly-known image processing to the image acquired from the image-capturing unit 28 so as to measure the spraying pressure and the spraying range, i.e., the surface pressure distribution, of the cleaning liquid L. For example, the control unit 24 calculates the spraying pressure of the cleaning liquid L based on the color density of the image. The control unit 24 also identifies the spraying range of the cleaning liquid L based on the color distribution in the image. Further, the control unit 24 stores in advance reference surface pressure distribution information obtained when the cleaning liquid L is normally sprayed from the injection nozzles 22. The obtained spraying pressure and spraying range are then compared with the reference surface pressure distribution information so as to determine whether the spraying condition of the cleaning liquid L such as the spraying pressure and the spraying range is in a proper condition.

When the control unit 24 in one example determines that the spraying condition of the cleaning liquid L is abnormal, the control unit 24 notifies the user of the cleaning device 1. This allows the user to promptly know that the spraying pressure or spraying range of the cleaning liquid L has changed due to clogging of the injection nozzles 22 or other reasons.

In the present embodiment, the control unit 24 is responsible for determining the spraying condition of the cleaning liquid L. Alternatively, a unit for determining the spraying condition may be provided independently of the control unit 24. The determination of the spraying condition may also be performed by the user of the cleaning device 1. For example, the image captured by the image-capturing unit 28 is shown on a monitor (not shown), and the user checks the image on the monitor so as to thereby determine the spraying condition. In this case, the inspection unit 12 functions as a determination support mechanism for the spraying condition. Further, the control unit 24 may adjust the spraying pressure and the like of the cleaning liquid L sprayed from the cleaning unit 10 according to the determination result.

When to perform the inspection of the spraying condition of the cleaning liquid L can be set appropriately. For example, the inspection of the spraying condition may be performed before, after, or both before and after the cleaning process for the injection member 2. The inspection may be performed automatically on a regular basis or may be performed irregularly at any time, such as when directed by the user of the cleaning device 1.

As explained above, the cleaning device 1 according to the present embodiment includes: a base 8 that supports a liquid injection member 2 that injects an electrolyte to a battery case; a cleaning unit 10 that sprays a cleaning liquid onto the liquid injection member 2 that is supported by the base 8; and an inspection unit 12 that inspects the spraying condition of the cleaning liquid L by receiving a spray of the cleaning liquid L from the cleaning unit 10. As described, by providing the inspection unit 12 in the cleaning device 1 and monitoring the condition of the cleaning unit 10, it is possible to easily and promptly know whether the cleaning liquid L is being sprayed at an appropriate position and at an appropriate pressure.

This allows maintenance of the cleaning unit 10 such as replacement of the injection nozzles 22 and adjustment of the spraying pressure of the cleaning liquid L to be performed more promptly when the cleaning power of the cleaning unit 10 has decreased. As a result, the effect of cleaning the liquid injection member 2 can be easily maintained, and the quality of cleaning the liquid injection member 2 can be improved. Further, since the inspection unit 12 is incorporated into the cleaning device 1, the condition of the cleaning unit 10 can be inspected during the cleaning process for the liquid injection member 2, i.e., in-line.

Further, the inspection unit 12 according to the present embodiment has a liquid receiver 26 that is mounted on the base 8 and receives a spray of the cleaning liquid L. The base 8 can be switched between a state in which the liquid injection member 2 faces the cleaning unit 10 and a state in which the liquid receiver 26 faces the cleaning unit 10. Therefore, the existing base 8 can be used to switch between a state in which the cleaning process for the liquid injection member 2 is performed by the cleaning unit 10 and a state in which the condition inspection of the cleaning unit is performed by the inspection unit 12. Therefore, it is possible to suppress the enlargement of the cleaning device 1 and an increase in the number of parts caused by the incorporation of an inspection mechanism.

Further, the inspection unit 12 according to the present embodiment has a liquid receiver 26 that receives a spray of a cleaning liquid L and an image-capturing unit 28 that captures images of the liquid receiver 26. Further, the liquid receiver 26 has a pressure-sensitive sheet 32 that changes color due to pressure received at the time of receiving a spray of the cleaning liquid L. The image-capturing unit 28 detects the color of the pressure-sensitive sheet 32 by capturing an image of the pressure-sensitive sheet 32. This allows the spraying condition of the cleaning liquid L to be inspected.

Described above is a detailed explanation on the embodiments of the present disclosure. The above-described embodiments merely show specific examples for carrying out the present disclosure. The details of the embodiments do not limit the technical scope of the present disclosure, and many design modifications such as change, addition, deletion, etc., of the constituent elements may be made without departing from the spirit of the present disclosure defined in the claims. New embodiments resulting from added design change will provide the advantages of the embodiments and variations that are combined. In the above-described embodiments, the details for which such design change is possible are emphasized with the notations "according to the embodiment", "in the embodiment", etc. However, design change is also allowed for those without such notations. Optional combinations of the constituting elements included in each embodiment are also valid as embodiments of the present disclosure. Hatching applied to a cross section of a drawing does not limit the material of an object to which the hatching is applied.

(Exemplary Variation)

Figure 5:
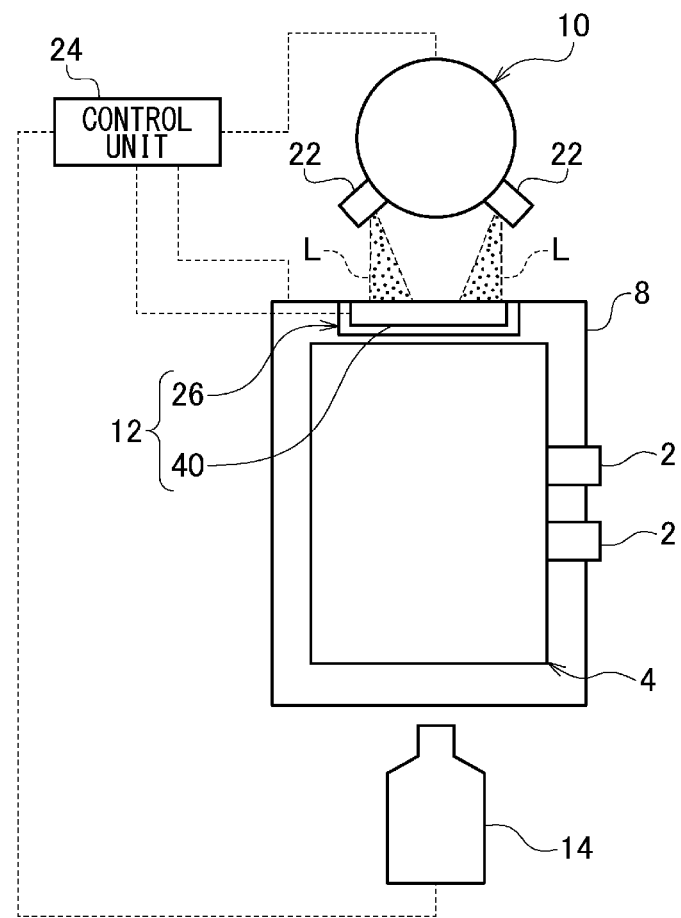
FIG. 5 is a schematic diagram of a cleaning device according to an exemplary variation.

FIG. 5 is a schematic diagram of a cleaning device 1 according to an exemplary variation. The inspection unit 12 has a liquid receiver 26 that receives a spray of the cleaning liquid L. The liquid receiver 26 according to the exemplary variation has a pressure-sensitive sensor 40 that detects the pressure received at the time of receiving a spray of the cleaning liquid L. The pressure-sensitive sensor 40 can consist of a publicly-known sensor that quantifies the applied pressure. The pressure-sensitive sensor 40 as an example receives a spray of the cleaning liquid L on a pressure measuring surface and calculates the magnitude of the pressure in each area based on the voltage value and capacitance in an area where the pressure is applied. The pressure-sensitive sensor 40 then sends the calculated result to the control unit 24. In other words, the pressure-sensitive sensor 40 outputs an electrical signal corresponding to the applied pressure. Based on the magnitude of the pressure acquired from the pressure-sensitive sensor 40 and the application position, the control unit 24 can determine whether the spraying condition of the cleaning liquid L is in a proper condition.

Also in such a configuration, the same effects as those obtained in the embodiment can be obtained. According to the present exemplary variation, the inspection unit 12 can be made smaller compared to a case where the inspection unit 12 has a liquid receiver 26 and an image-capturing unit 28. Therefore, the inspection unit 12 can be more easily mounted on the cleaning device 1.

The embodiment may be defined by the items described in the following.

[Item 1]

A cleaning device (1) comprising:
a base (8) that supports a liquid injection member (2) that injects an electrolyte to a battery case;
a cleaning unit (10) that sprays a cleaning liquid (L) onto the liquid injection member (2) supported by the base (8); and
an inspection unit (12) that inspects the spraying condition of the cleaning liquid (L) by receiving a spray of the cleaning liquid (L) from the cleaning unit (10).

[Item 2]

The cleaning device (1) according to Item 1, wherein
the inspection unit (12) has a liquid receiver (26) that is mounted on the base (8) and receives a spray of the cleaning liquid (L), and
the base (8) can be switched between a state in which the liquid injection member (2) faces the cleaning unit (10) and a state in which the liquid receiver (26) faces the cleaning unit (10).

[Item 3]

The cleaning device (1) according to Item 1 or 2, wherein
the inspection unit (12) has a liquid receiver (26) that receives a spray of a cleaning liquid (L) and an image-capturing unit (28) that captures an image of the liquid receiver (26), the liquid receiver (26) has a pressure-sensitive sheet (32) that changes color due to pressure received at the time of receiving the spray of the cleaning liquid (L), and the image-capturing unit (28) captures an image of the pressure-sensitive sheet (32) so as to detect the color of the pressure-sensitive sheet (32).

[Item 4]

The cleaning device (1) according to Item 1 or 2, wherein the inspection unit (12) has a liquid receiver (26) that receives a spray of the cleaning liquid (L), and the liquid receiver (26) has a pressure-sensitive sensor (40) that detects pressure received at the time of receiving the spray of the cleaning liquid (L).

The invention claimed is:

1. A cleaning device comprising:
a base that supports a liquid injection member that injects an electrolyte to a battery case;
a cleaning unit that sprays a cleaning liquid onto the liquid injection member supported by the base; and
an inspection unit that inspects the spraying condition of the cleaning liquid by receiving a spray of the cleaning liquid from the cleaning unit.

2. The cleaning device according to claim 1, wherein
the inspection unit has a liquid receiver that is mounted on the base and receives a spray of the cleaning liquid, and
the base can be switched between a state in which the liquid injection member faces the cleaning unit and a state in which the liquid receiver faces the cleaning unit.

3. The cleaning device according to claim 1, wherein
the inspection unit has a liquid receiver that receives a spray of a cleaning liquid and an image-capturing unit that captures an image of the liquid receiver,
the liquid receiver has a pressure-sensitive sheet that changes color due to pressure received at the time of receiving the spray of the cleaning liquid, and
the image-capturing unit detects the color of the pressure-sensitive sheet by capturing an image of the pressure-sensitive sheet.

4. The cleaning device according to claim 1, wherein
the inspection unit has a liquid receiver that receives a spray of the cleaning liquid, and
the liquid receiver has a pressure-sensitive sensor that detects the pressure received at the time of receiving the spray of the cleaning liquid.

* * * * *